United States Patent
Iriyama et al.

(10) Patent No.: US 6,625,886 B2
(45) Date of Patent: Sep. 30, 2003

(54) MANUFACTURING METHOD OF HEAT EXCHANGER

(75) Inventors: Syoji Iriyama, Anjo (JP); Koji Hirao, Tokai (JP); Hiroshi Ogawa, Nagoya (JP); Takanori Takeda, Kariya (JP); Hiroshi Nishikawa, Nishio (JP); Satoshi Nohira, Nisho (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/173,301

(22) Filed: Jun. 17, 2002

(65) Prior Publication Data

US 2003/0033715 A1 Feb. 20, 2003

(30) Foreign Application Priority Data

Jul. 5, 2001 (JP) ..................................... 2001-205261

(51) Int. Cl.[7] ................................................ B23P 15/26
(52) U.S. Cl. .......................... 29/890.047; 29/890.043; 29/890.054; 228/183; 228/227; 228/232
(58) Field of Search ................. 29/890.054, 890.043, 29/890.047; 228/183, 227, 232

(56) References Cited

U.S. PATENT DOCUMENTS

| 3,833,986 A | * | 9/1974 | DeCicco | 29/890.047 |
|---|---|---|---|---|
| 4,054,239 A | * | 10/1977 | Watson, Jr. | 228/183 |
| 4,291,450 A | * | 9/1981 | Rhodes | 29/890.048 |
| 4,852,791 A | * | 8/1989 | Otsuka et al. | 228/183 |
| 4,911,351 A | * | 3/1990 | Ishikawa et al. | 228/183 |
| 4,989,775 A | * | 2/1991 | Shimajiri et al. | 228/218 |
| 5,174,490 A | * | 12/1992 | Koisuka et al. | 228/183 |
| 5,322,209 A | * | 6/1994 | Barten et al. | 228/183 |
| 5,755,374 A | * | 5/1998 | Prigmore | 228/183 |
| 6,059,174 A | * | 5/2000 | Kojima et al. | 228/183 |

* cited by examiner

*Primary Examiner*—I Cuda-Rosenbaum
(74) *Attorney, Agent, or Firm*—Harness, Dickey & Pierce, PLC

(57) ABSTRACT

In a manufacturing method of a heat exchanger including a core portion having a plurality of tubes and a plurality of radiation fins connected to surfaces of the tubes, and a tank portion communicating with the tubes, a preheating step, a brazing step, a gradual cooling step and a cooling step are performed in this order. In the preheating step, temperature of the tank portion having a large heat capacity is increased earlier than that of the core portion having a small heat capacity. Therefore, the temperature of the tank portion is rapidly increased, and the temperature of the core portion is obediently increased in accordance with the temperature increase of the tank portion.

13 Claims, 7 Drawing Sheets

MANUFACTURING METHOD OF HEAT EXCHANGER

CROSS REFERENCE TO RELATED APPLICATION

This application is based on Japanese Patent Application No. 2001-205261 filed on Jul. 5, 2001, the disclosure of which is incorporated herein by reference.

FIELD OF THE INVENTION

The present invention relates to a method for manufacturing a heat exchanger having different heat capacity in partial. The heat exchanger includes a core portion having plural tubes through which a thermal medium flows and plural radiation fins connected to surfaces of the tubes, and a tank portion communicating with the tubes.

BACKGROUND OF THE INVENTION

In a manufacturing method for manufacturing a heat exchanger composed of a core portion and a tank portion communicating with tubes of the core portion, the tank portion and the tubes are bonded by brazing, and radiation fins are bonded onto the tubes between adjacent tubes by the brazing. Therefore, a brazing filler-metal material having a flux thereon is disposed at bonding parts of the members such as the tubes, the radiation fins and the tank portion to assemble the members. Specifically, a preheating step, a brazing step, a gradual cooling step and a cooling step are performed in this order. An assembly of the members are heated until the flux is melted in the preheating step, and are heated until the brazing filler-metal material is melted in the brazing step. Then, the gradual cooling step is performed until the brazing filler-metal material is solidified. Next, the cooling step is performed until the temperature of the heat exchanger becomes room temperature.

The heat exchanger includes a thinner part such as a core portion having a small heat capacity, and a thicker part such as the tank portion having a large heat capacity. Therefore, it is difficult to uniformly increase the temperature of the entire assembly when the assembly is heated in the preheating step. Further, in the preheating step, it is necessary to continuously heat the assembly until the temperature of the thicker part having the large heat capacity is increased to a brazing temperature after the thinner part having the small heat capacity reaches the brazing temperature. Accordingly, heating time in the preheating step becomes longer, and production efficiency is deteriorated. Further, since the brazing filler-metal material (especially, Si in the brazing material) is moved in a plate thickness direction or is moved to the thin part such as the radiation fins, erosion may be caused. Therefore, the radiation fins may be melted, and durability of the heat exchanger may be deteriorated.

SUMMARY OF THE INVENTION

In view of the foregoing problems, it is an object of the present invention to provide a manufacturing method for manufacturing a heat exchanger, which improves durability of the heat exchanger while improving product efficiency thereof.

A manufacturing method according to the present invention is suitably used for a heat exchanger including a core portion having a plurality of tubes and a plurality of radiation fins connected to surfaces of the tubes, and a tank portion communicating with the tubes. The manufacturing method includes: preheating the heat exchanger until a temperature where a flux in the heat exchanger is melted, heating the heat exchanger after the preheating until a temperature where a brazing filler-metal material (brazing material) in the heat exchanger is melted, and cooling the heat exchanger after the heating. The cooling can include a first cooling step for gradually cooling the beat exchanger after the heating to a temperature where the brazing filler-metal material is solidified, and a second cooling step for further cooling the heat exchanger to a room temperature after the first cooling step. In addition, in the preheating, a temperature of a first part of the heat exchanger, having a heat capacity larger than a predetermined capacity, is increased earlier than a temperature of a second part of the heat exchanger, having a heat capacity smaller than the predetermined capacity. Accordingly, in the preheating, the temperature of the tank portion is increased to be equal to or higher than that of the core portion, and the temperature of the core portion is obediently increased in accordance with the temperature increase of the tank portion. Thus, it can prevent an erosion from being caused in the heat exchanger.

When the first part is the tank portion, and the second part is the core portion, the manufacturing method improves durability of the core portion of the heat exchanger and improves production efficiency thereof.

Preferably, in the preheating, a high-temperature gas is blown toward the first part to increase the temperature of the first part earlier than that of the second part. Therefore, the temperature of the first part having the large heat capacity can be readily increased earlier than the temperature of the second part.

Preferably, in the preheating, the high-temperature gas has a temperature equal to higher than 450° C., or/and the high-temperature gas is blown toward the first part by a flow speed equal to or larger than 5 m/second. Therefore, a thermal increase time of the first part having the large heat capacity can be shortened without reducing the durability of the heat exchanger.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
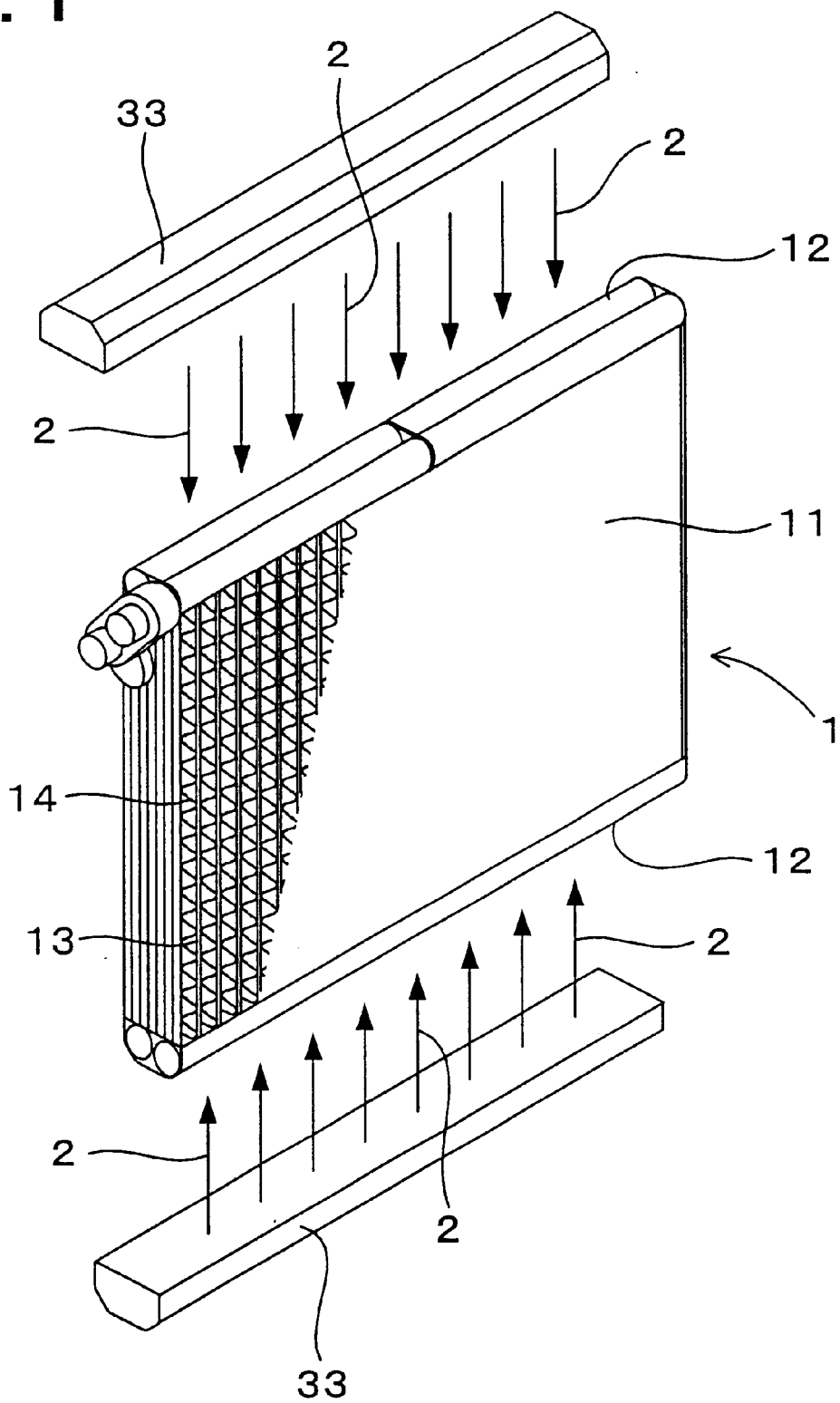
FIG. 1 is a schematic perspective view of a heat exchanger, showing a flow of a high-temperature gas, according to a first embodiment of the present invention.

Preferred embodiments of the present invention will be described with reference to the accompanying drawings.

(First Embodiment)

A manufacturing method of a heat exchanger according to the first embodiment of the present invention will be now described with reference to FIGS. 1–5. For example, in the first embodiment, a heat exchanger 1 includes a core portion 11, and a pair of tanks 12 at both sides of the core portion 11. The core portion 11 includes plural tubes 13 in which a thermal medium flows, and plural radiation fins 14 bonded to the surfaces of the tubes 13 between adjacent tubes 12. The tanks 12 are disposed to be communicated with the tubes 13.

In this embodiment, a preheating step, a brazing step, a gradually cooling step and a cooling step are performed in this order, so that the tank portion 12 and the tubes 13 are brazed while the tubes 13 and the radiation fins 14 are brazed.

Figure 3:
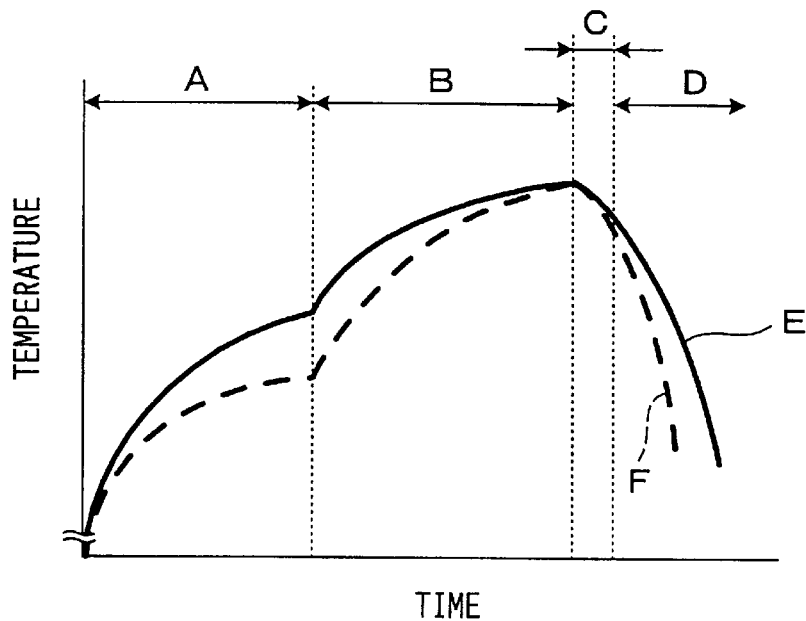
FIG. 3 is a graph showing a temperature change in each of a core portion and a tank portion of the heat exchanger, according to the first embodiment.

In FIG. 3, the graph indicated by the solid line E shows a temperature change in the tanks 12, and the graph indicated by the chain line F shows a temperature change in the core portion 11. Further, A indicates the preheating step, B indicates the brazing step, C indicates the gradually cooling step, and D indicates the cooling step. In the preheating step, as shown in FIG. 3, the temperature of the tanks 12, that is a first part having a larger heat capacity in the heat exchanger 1, is increased early, as compared with the core portion 11 that is a second part having a smaller heat capacity in the heat exchanger 1. That is, in the preheating step, the temperature of the tanks 12 is increased earlier to be equal to or more that the temperature of the core portion 11.

Figure 2:
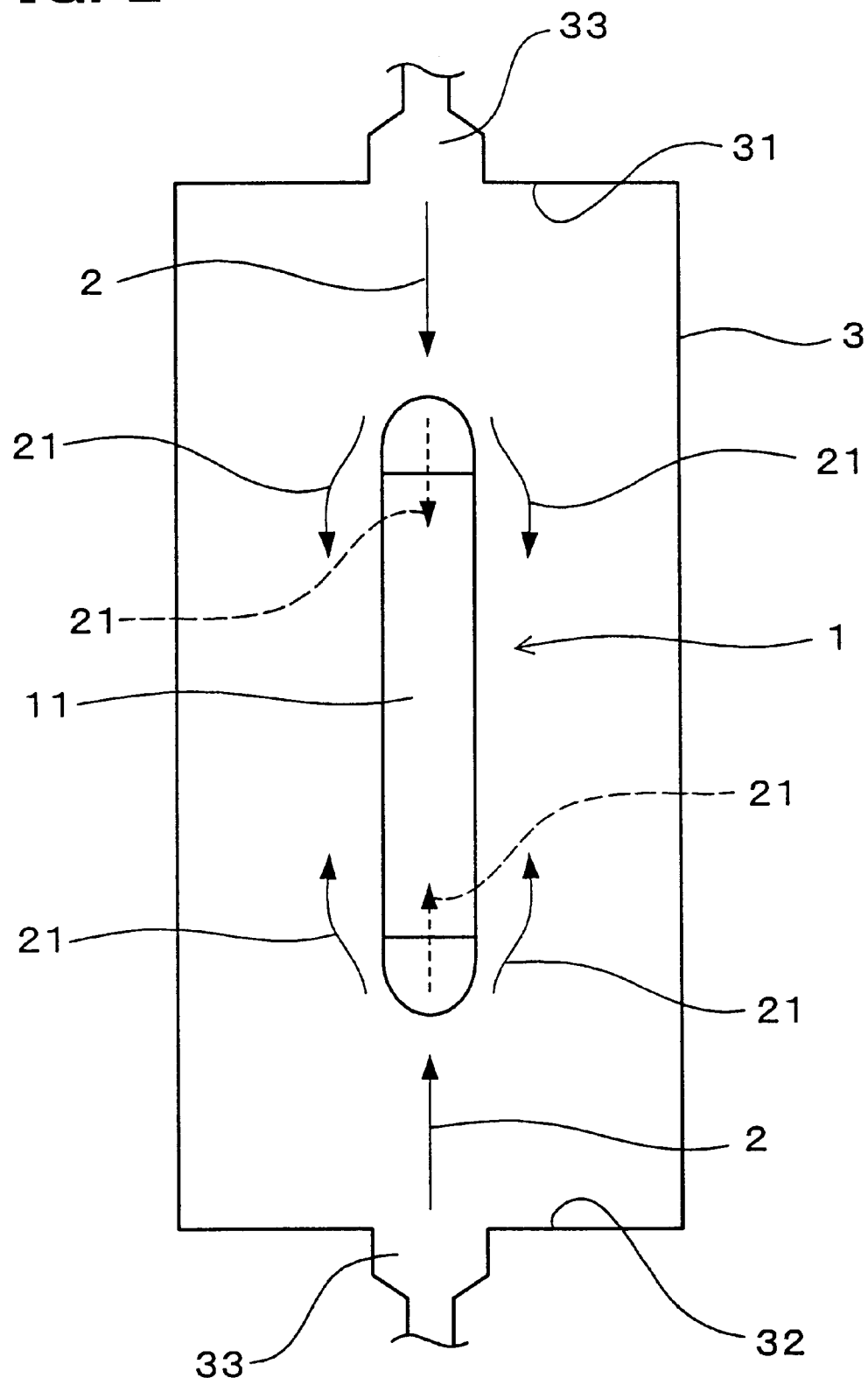
FIG. 2 is a schematic sectional view of the heat exchanger, showing the flow of the high-temperature gas, according to the first embodiment.

For early increasing the temperature of the tanks 12, high-temperature gas 2 is directly blown to the tanks 12 having the larger heat capacity, in the preheating step, as shown in FIGS. 1 and 2. Specifically, as shown in FIG. 1, the heat exchanger 1 having the two tanks 12 at both the upper and lower sides of the core portion 11 is disposed in a heating furnace 3, as shown in FIG. 2. Injection ports 33 for injecting the high-temperature gas 2 are provided in an upper surface 31 and a lower surface 32 of the heating furnace 3, so that the high-temperature gas 2 is blown toward the tanks 12 of the heat exchanger 1 from the injection ports 31. Here, the arrangement positions of the injection ports 31 are not limited to the upper surface 31 and the lower surface 32 of the heating furnace 3. That is, the arrangement position of each injection port 33 may be suitably set so that the high-temperature gas 2 is preferably blown to the tank portion 12.

The high-temperature gas 2 is obtained by burning a combustion gas in the atmosphere (air). For example, nitrogen gas can be used as the high-temperature gas 2. In this case, the oxidation of the heat exchanger 1 can effectively prevented. In this embodiment, the temperature of the high-temperature gas 2 is equal to or higher than 450° C., and a flow speed of the high-temperature gas 2 is equal to or larger than 5 m/s (m/second). Therefore, the time for increasing the temperature of the tanks 12 can be shortened.

A plate thickness of a metal plate for forming the tanks 12 is about in a range of 0.6–1.0 mm. Therefore, the heat capacity of the tanks 12 is large, and it is difficult to increase the temperature of the tanks 12. On the other hand, a plate thickness of a metal plate for forming the core portion 11 is in a range of 0.05–0.15 mm, for example. Therefore, the heat capacity of the core portion 11 is small, and the temperature of the core portion 11 is readily increased.

The assembly of the heat exchanger 1 is heated by the high-temperature gas 2 in the preheating step as indicated by A in FIG. 3, to a temperature at which the flux on the metal plate is melted. After the preheating step, the assembly is further heated in the brazing step as indicated by B in FIG. 3, to a temperature at which the brazing filler-metal material in the metal plate is melted. In the gradually cooling step after the brazing step, as indicated by C in FIG. 3, the assembly is further cooled until the brazing filler-metal material solidifies. In the cooling step after the gradually cooling step, as indicated by D in FIG. 3, the assembly is cooled to the room temperature, so that the heat exchanger 1 including plural brazed members is formed.

Figure 4:
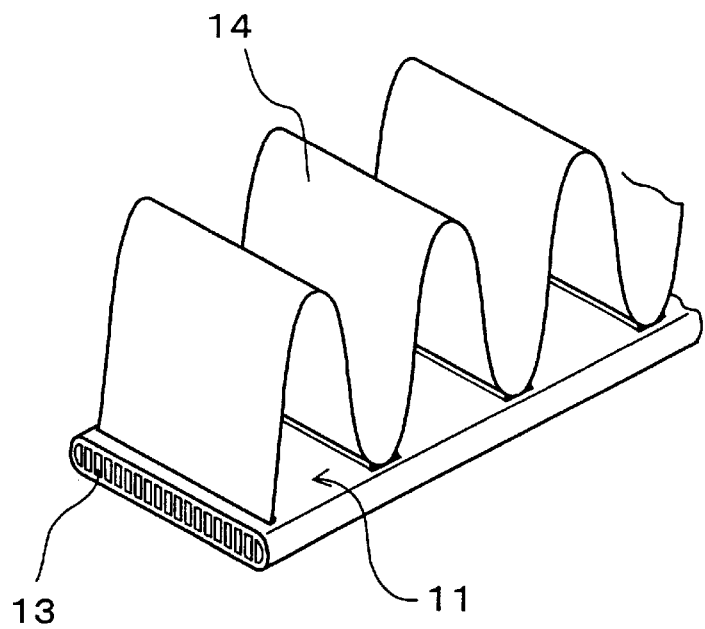
FIG. 4 is a perspective view showing a bonding state between a tube and a radiation fin of the core portion, according to the first embodiment.
Figure 5:
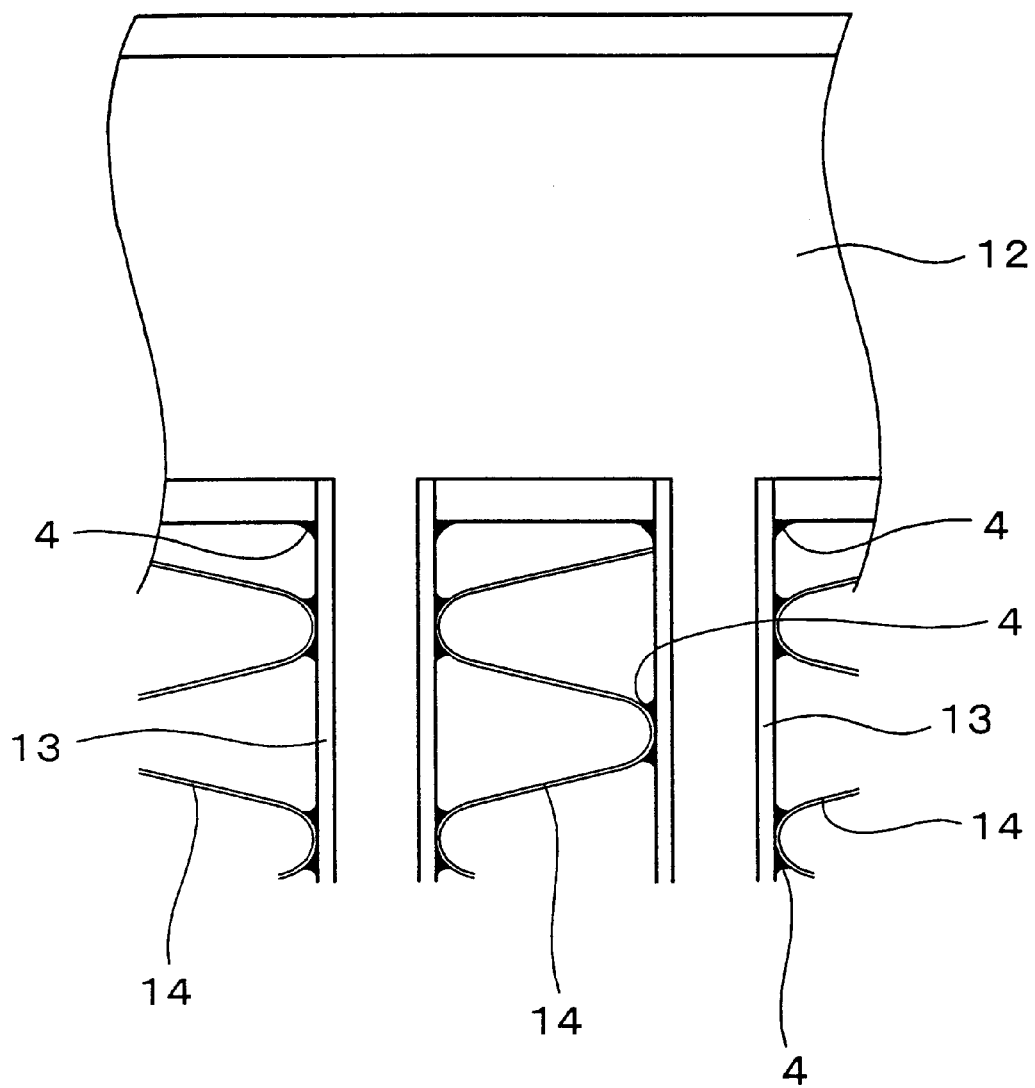
FIG. 5 is a schematic sectional view showing a bonding state between the tank portion, the tubes and the radiation fins, according to the first embodiment.

In the first embodiment, as shown in FIGS. 4 and 5, a brazing filler-metal material having the flux thereon is used at bonding portions between the tanks 12 and the tubes 13, and at bonding portions between the tubes 13 and radiation fins 14, so that the brazing of the heat exchanger 1 is performed. Accordingly, the assembly of the heat exchanger 1 is heated at a temperature equal to or lower than a melting temperature of the flux on the brazing filler-metal material, in the preheating step.

According to the first embodiment of the present invention, the temperature of the tanks 12 having the large heat capacity is increased earlier than that of the core portion 11 having the small heat capacity, as shown in FIG. 3. That is, the temperature of the tanks 12 that is difficult to be thermally increased is firstly increased. Accordingly, the temperature of the core portion 11 is obediently increased with the thermal increase of the tanks 12 by a heat radiation, a heat circulation or a heat transmission shown by the reference number 21 of FIG. 2. Thereafter, the whole heat exchanger 1 is uniformly heated. Because the core portion 11 having the small heat capacity is readily thermally increased, the temperature of the core portion 11 is readily changed to have an early servility relative to the temperature of the tanks 12.

As a result, the time for increasing the whole heat exchanger 1 can be shortened, and the product efficiency of the heat exchanger 1 can be improved. Because the time for heating the heat exchanger 1 can be shortened, it can restrict diffusion of the brazing filler-metal material to the core portion 11, and erosion in the heat exchanger. Thus, the heat exchanger 1 can be formed to have a sufficient durability, and the thickness of the metal plate for forming the heat exchanger 1 can be made thinner.

According to the first embodiment of the present invention, the high-temperature gas 2 is blown to the tanks 12, the temperature of the tanks 12 can be readily accurately increased rapidly. Because the temperature of the high-temperature gas 2 is equal to or higher than 450° C. and the flow speed thereof is equal to or larger than 5 m/s, the time for increasing the temperature of the tanks 12 can be sufficiently shortened. Accordingly, the heat exchanger 1 can be accurately brazed without reducing the durability. Thus, according to the method for manufacturing the heat exchanger 1 of the first embodiment, the heat exchanger 1 has an improved durability and an improved product efficiency.

In the above-described first embodiment, the temperature of the high-temperature gas 2 is equal to or higher than 450° C. and the flow speed thereof is equal to or larger than 5 m/s.

However, the temperature of the high-temperature temperature gas 2 can be set in a range of 450–600° C., and the flow speed thereof can be set in a range of 5–15 m/s. In this case, the temperature of the assembly of the heat exchanger 1 can be readily suitably controlled, and the durability of the heat exchanger 1 can be further improved.

(Second Embodiment)

Figure 6:
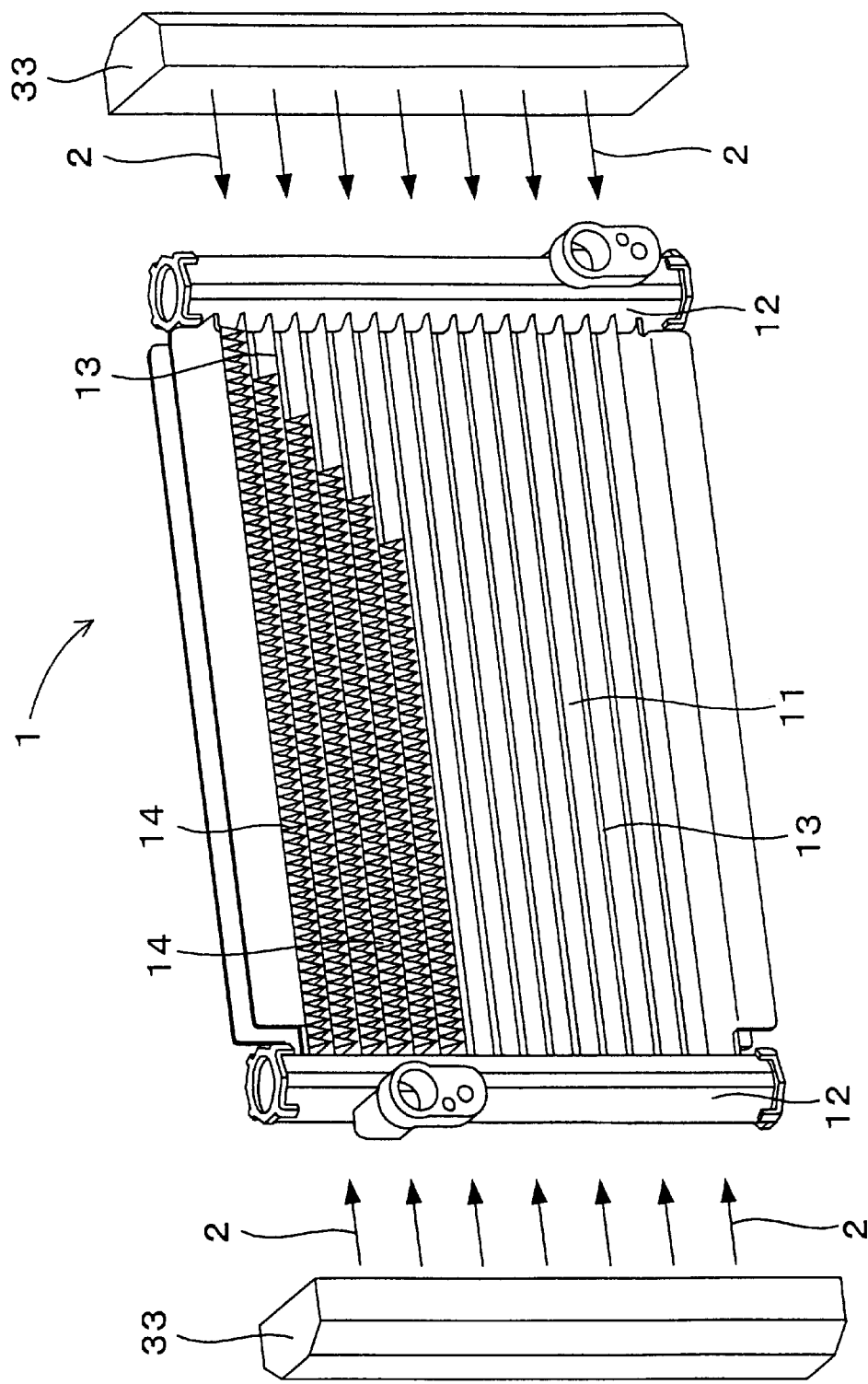
FIG. 6 is a schematic perspective view of a heat exchanger, showing a flow of a high-temperature gas, according to a second embodiment of the present invention.

The second embodiment of the present invention will be described with reference to FIG. 6. In the second embodiment, as shown in FIG. 6, a heat exchanger 1 having tanks 12 at right and left two sides of the core portion 11 is manufactured. In this case, the injection ports 33 of the high-temperature gas 2 are provided at both the right and left sides, so that the high-temperature gas 2 is directly blown to the tanks 12 of the heat exchanger 1.

In the second embodiment, the other parts are similar to those of the above-described first embodiment, and the detail explanation thereof is omitted.

(Third Embodiment)

The third embodiment of the present invention will be described with reference to FIGS. 7 and 8. In the third embodiment, the manufacturing method of the heat exchanger 1 of the present invention is compared with that of a comparison example. In the third embodiment, the heat exchanger 1 of the above-described first embodiment is used as a heat exchanger. Further, in the heat exchanger of the third embodiment, the core portion and the tanks are formed by a metal plate made of a material of A3003, and the brazing filler-metal material is made of a material of A4045.

Figure 7:
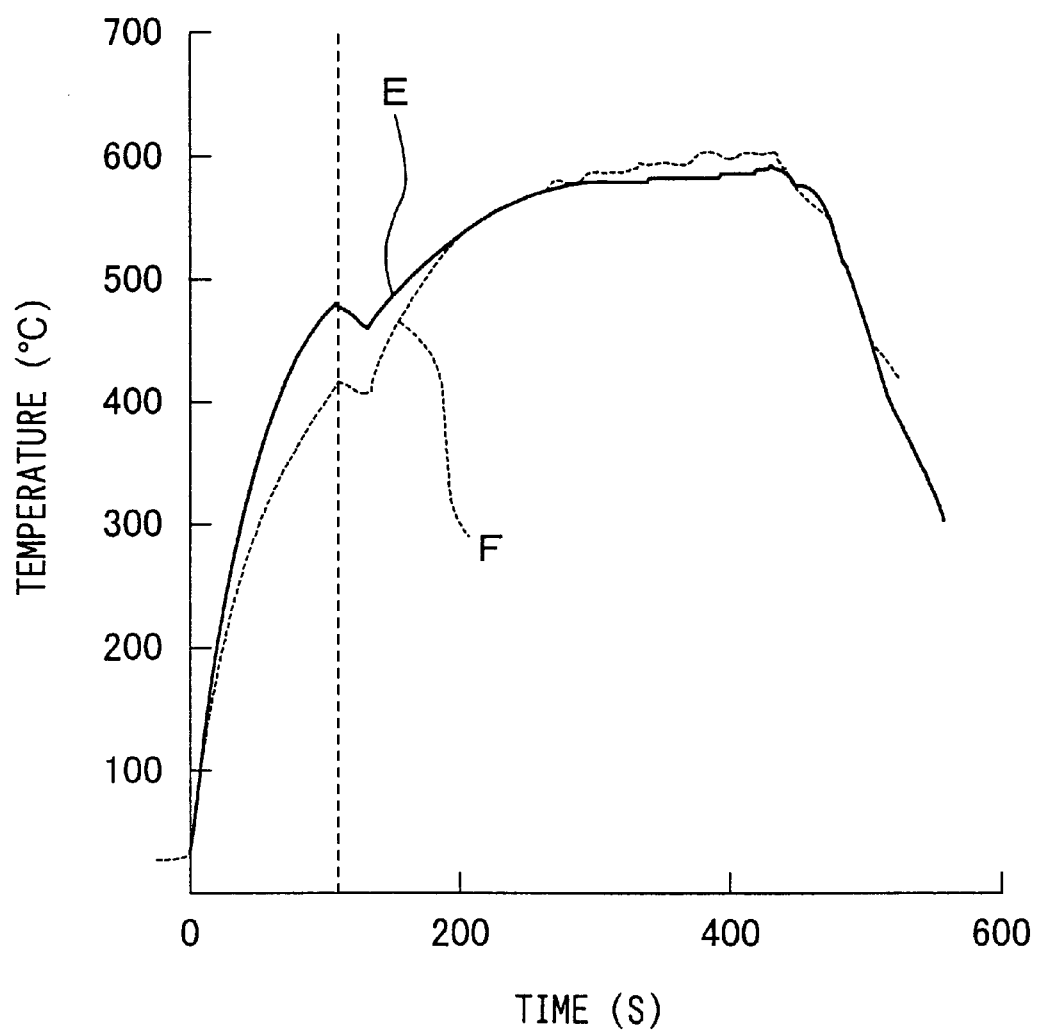
FIG. 7 is a graph showing a temperature change in each of a core portion and a tank portion of a heat exchanger according to a third embodiment of the present invention.

In FIG. 7, the solid line E shows the temperature change of the tanks, and the chain line F shows the temperature change of the core portion. In the third embodiment, the temperature change of the tanks and the temperature change of the core portion of the heat exchanger are measured from the preheating step to the cooling step in the manufacturing method of the present invention. Here, the flow speed of the high-temperature gas is set at 12 m/s, and the temperature of the high-temperature gas is set at 600° C.

Figure 8:
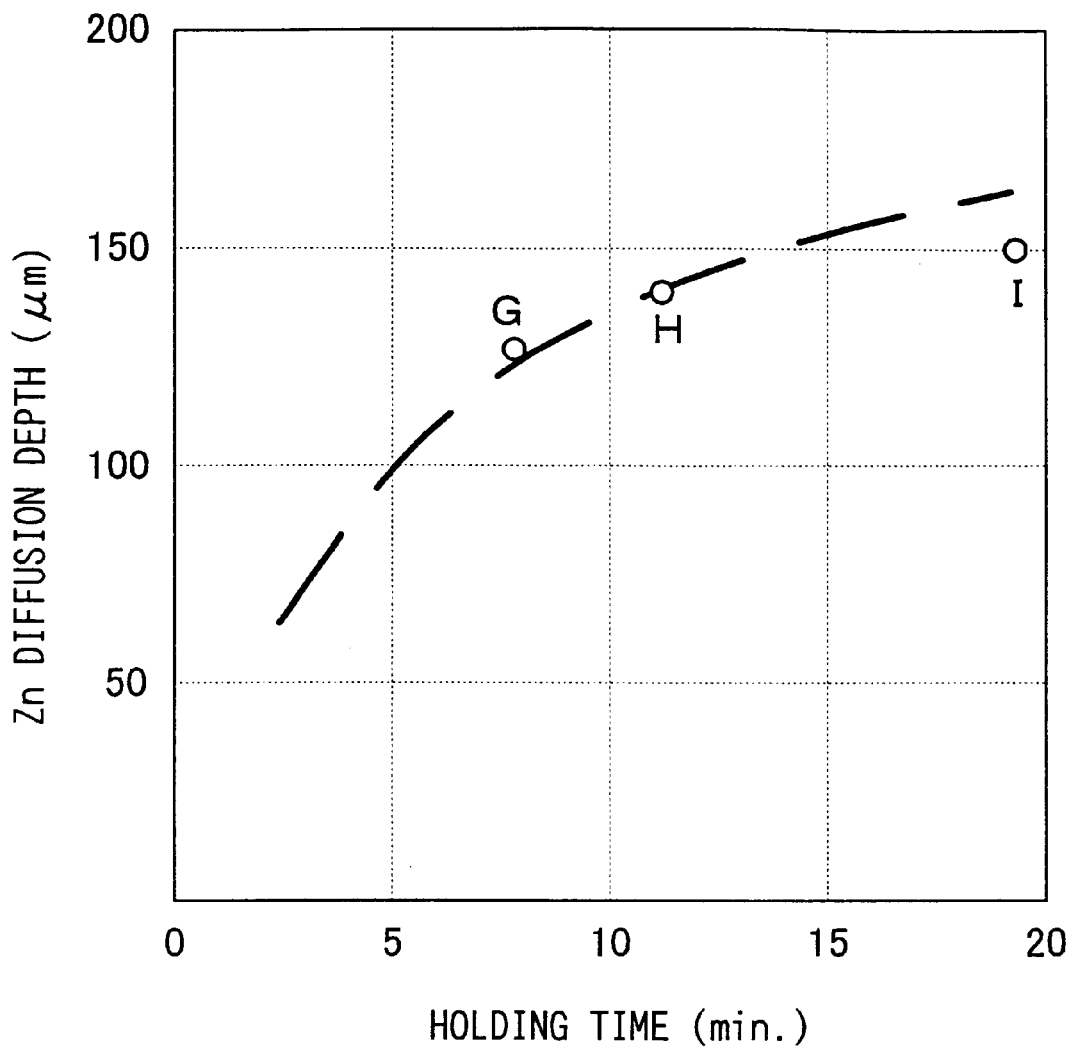
FIG. 8 is a graph showing a relationship between a holding time for which the heat exchanger is maintained at a temperature equal to or higher than 450° C., and a Zn diffusion depth, according to the third embodiment.

Next, the relationship between holding time T, for A which the temperature of the heat exchanger is maintained to be equal to or higher than 450° C., and Zn-diffusion depth, is measured as shown in FIG. 8. Generally, the Zn-diffusion depth due to the brazing in the core portion and tanks of the heat exchanger is readily caused in a temperature range equal to or higher than 450° C.

In this examination, the Zn-diffusion depth is measured at a portion around a center of the core portion in the tubes made of a metal plate having a total thickness of 0.2 mm. The metal plate at this portion is a clad material constructed by a core material made of A3003 having a thickness of 0.15 mm, a sacrificial material made of AI-10Si-2.7Zn having a thickness of 0.03 mm, and a brazing filler-metal material made of A4045 having a thickness of 0.02 mm. The sacrificial material is made of a metal having an electrical potential lower than that of the core material, to be preferentially corroded as compared with the core material. Here, since the direction for performing the corrosion is perpendicular to the thickness direction of the metal plate, the layer of the sacrificial material restricts corrosion in a direction penetrating through the metal plate.

Next, the corrosion of the heat exchanger, the erosion generation in the brazing, and a melt of the radiation fins in the present invention are compared with that in a comparison example, as shown in Table 1.

TABLE 1

| BRAZING METHOD | HOLDING TIME T (MINUTE) | CORROSION DEPTH | RESULT | FIN EROSION | MELTING |
|---|---|---|---|---|---|
| PRESENT EXAMPLE I | ABOUT 8 | 130 µm | USABLE | NON | NON |
| PRESENT EXAMPLE II | ABOUT 12 | 150 µm | USABLE | NON | NON |
| COMPARISON EXAMPLE | ABOUT 19 | PENETRATE THROUGH | UN-USABLE | GENE-RATION | GENE-RATION |

In table 1, the corrosion depth of the metal plate is measured when the heat exchanger is placed in a salt-water combined cycle adding a sulphate ion for 500 hours. Further, it is determined whether or the erosion is generated in the brazing, and whether or not a melt of the radiation fin is generated.

In the manufacturing method of the present example I of the present invention, the holding time T, for which the temperature of the heat exchanger is maintained to be equal to or higher than 450° C., is set at 8 minutes. In the manufacturing method of the present example II of the present invention, the holding time T, for which the temperature of the heat exchanger is maintained to be equal to or higher than 450° C., is set at 12 minutes. In the present examples I and II, as shown in FIG. 7, the temperature of the tanks is early increased, and the temperature of the core portion is increased obediently in accordance with the temperature increase of the tanks. Thereafter, the temperature of the core portion becomes approximately equal to that of the tanks in the brazing step. In the present invention, generally, the time period from the start of the preheating step to the finish of the brazing step is about 7 minutes.

On the other hand, in the comparison example, the heat exchanger is manufactured by a method where an assembly of a heat exchanger is heated without preferentially increasing the temperature of the tanks in the preheating step, and the holding time T is set at 19 minutes. Therefore, in the comparison example, the temperature of the core portion is early increased, and the temperature of the tanks is increased in accordance with the increase of the temperature of the core portion. In the comparison example, the time period from the start of the preheating step to the finish of the brazing step is about 20 minutes.

In the manufacturing method of the present invention, the holding time T, for which the temperature of the heat exchanger (assembly) is equal to or higher than 450° C., can be made approximately 8 minutes, as shown in FIG. 7. Therefore, the Zn diffusion relative to the metal plate for forming the core portion and the tanks can be restricted. As shown by G in FIG. 8, when the holding time T is about 8 minutes, the depth of the Zn diffusion is smaller than the thickness of the core material. Even when the holding time T is about 12 minutes, the depth of the Zn diffusion is smaller than the thickness of the core material, as shown by H in FIG. 8. Accordingly, as indicated in Table 1, the penetration due to the corrosion, the erosion or the melt of the radiation fin in the obtained heat exchanger is not caused in the present examples I and II of the present invention.

In the comparison example, because the holding time T is about 19 minutes, the depth of the Zn diffusion reaches the thickness of the core material, as shown by I in FIG. 8. Accordingly, as indicated in Table 1, the penetration due to the corrosion, the erosion or the melt of the radiation fin in the obtained heat exchanger is caused in the comparison example.

Accordingly, the advantages of the present invention can be further confirmed in the above-described experiments.

Although the present invention has been fully described in connection with the preferred embodiments thereof with reference to the accompanying drawings, it is to be noted that various changes and modifications will become apparent to those skilled in the art.

For example, in the above-described embodiments of the present invention, the tanks are disposed at both sides of the core portion in the heat exchanger. However, the present invention may be applied to a heat exchanger having a tank only at one side of the core portion.

The heat exchanger manufactured by the method of the present invention can be used for various heaters, a vehicle radiator, a vehicle condenser, an evaporator, a condenser or the like.

Such changes and modifications are to be understood as being within the scope of the present invention as defined by the appended claims.

What is claimed is:

1. A manufacturing method for manufacturing a heat exchanger including a core portion having a plurality of tubes and a plurality of radiation fins connected to surfaces of the tubes, and a tank portion communicating with the tubes, the manufacturing method comprising:

preheating the heat exchanger to a temperature where a flux in the heat exchanger is melted;

heating the heat exchanger after the preheating to a temperature where a brazing material in the heat exchanger is melted; and cooling the heat exchanger after the heating, wherein:

in the preheating, a temperature of a first part of the heat exchanger, having a heat capacity larger than a predetermined capacity is increased earlier than a temperature of a second part of the heat exchanger, having a heat capacity smaller than the predetermined capacity.

2. The manufacturing method according to claim 1, wherein:

the first part is the tank portion, and the second part is the core portion.

3. The manufacturing method according to claim 1, wherein:

in the preheating, a high-temperature gas is blown toward the first part to increase the temperature of the first part earlier than that of the second part.

4. The manufacturing method according to claim 3, wherein:

in the preheating, the high-temperature gas is obtained by burning a combustion gas in air.

5. The manufacturing method according to claim 3, wherein:

in the preheating, the high-temperature gas is a nitrogen gas.

6. The manufacturing method according to claim 3, wherein:

in the preheating, the high-temperature gas has a temperature equal to higher than 450° C.

7. The manufacturing method according to claim 3, wherein:

in the preheating, the high-temperature gas is blown toward the first part by a flow speed equal to or larger than 5 m/second.

8. The manufacturing method according to claim 6, wherein:

in the preheating, the high-temperature gas has a temperature in a range of 450–600° C.

9. The manufacturing method according to claim 8, wherein:

in the preheating, the flow speed of the high-temperature gas blown toward the first part is in a range of 5–15 m/second.

10. The manufacturing method according to claim 1, wherein:

in the preheating, the temperature of the second part increases obediently in accordance with an increase of the temperature of the first part.

11. The manufacturing method according to claim 1, wherein:

the tank portion has two tanks at opposite sides of the core portion; and in the preheating, the temperature of the tanks is increased earlier than that of the core portion.

12. The manufacturing method according to claim 11, wherein:

in the preheating, high-temperature gas is blown to the tanks.

13. The manufacturing method according to claim 1, wherein:

the cooling includes a first cooling step for gradually cooling the heat exchanger after the heating to a temperature where the brazing material is solidified, and a second cooling step for further cooling the heat exchanger to a room temperature after the first cooling step.

* * * * *